(12) United States Patent
He et al.

(10) Patent No.: US 9,511,880 B2
(45) Date of Patent: Dec. 6, 2016

(54) FLIGHT DECK DISPLAY SYSTEMS AND METHODS FOR GENERATING VERTICAL SPEED ALERTS DURING STEEP APPROACHES OF ROTARY WING AIRCRAFT

(71) Applicant: HONEYWELL INTERNATIONAL INC., Morristown, NJ (US)

(72) Inventors: Gang He, Morristown, NJ (US); Jason F. Harvey, Glendale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/673,948

(22) Filed: Mar. 31, 2015

(65) Prior Publication Data

US 2016/0288922 A1    Oct. 6, 2016

(51) Int. Cl.
G08B 21/00 (2006.01)
B64D 45/08 (2006.01)
B64D 43/02 (2006.01)

(52) U.S. Cl.
CPC ............... *B64D 45/08* (2013.01); *B64D 43/02* (2013.01)

(58) Field of Classification Search
CPC   G08G 1/052; G08G 5/0021; G01S 13/9303; B64D 45/00
USPC ........................................................ 340/946
See application file for complete search history.

(56) References Cited

U.S. PATENT DOCUMENTS

| | | | |
|---|---|---|---|
| 6,020,832 A | 2/2000 | Jensen | |
| 8,395,534 B2 | 3/2013 | Christophe et al. | |
| 9,245,450 B1* | 1/2016 | Chiew | G05D 1/0676 |
| 2004/0181318 A1* | 9/2004 | Redmond | G01O 5/005 701/9 |
| 2006/0238377 A1 | 10/2006 | Stiles et al. | |
| 2010/0318295 A1* | 12/2010 | Flotte | G08G 5/0021 701/301 |
| 2011/0187562 A1* | 8/2011 | Botargues | G08G 5/045 340/970 |
| 2014/0207315 A1 | 7/2014 | He | |
| 2015/0232176 A1* | 8/2015 | Gillett | G05D 1/0607 416/1 |
| 2015/0307204 A1* | 10/2015 | May | G01P 15/02 701/14 |

FOREIGN PATENT DOCUMENTS

| | | |
|---|---|---|
| EP | 2816432 A1 | 12/2014 |
| WO | 0190694 A2 | 11/2001 |

OTHER PUBLICATIONS

Extended EP Search Report for Application No. 161625082-1557 dated Oct. 14, 2016.

(Continued)

*Primary Examiner* — Don N Vo
(74) *Attorney, Agent, or Firm* — Lorenz & Kopf, LLP (57) ABSTRACT

Embodiments of a flight deck display system deployed onboard a rotary wing aircraft are provided, as are embodiments of a method carried-out by a flight deck display system. In one embodiment, the flight deck display system includes a controller operably coupled to a cockpit display device. The controller is configured to: (i) generate a Primary Flight Display (PFD) on the cockpit display device including a vertical speed indicator; (ii) establish a first vertical speed alert threshold; (iii) compare the first vertical speed alert threshold to a current vertical speed of the rotary wing aircraft; and (iv) if the current vertical speed of the rotary wing aircraft exceeds the first vertical speed alert threshold, produce a first vertical speed alert on the PFD by altering the appearance of the vertical speed indicator in a first predetermined manner.

20 Claims, 4 Drawing Sheets

(56) References Cited

OTHER PUBLICATIONS

Grand Rapids Technologies, "GRT Sport Model SX User's Guide and Reference Rev D", Sep. 2010, p. 1-91, KP055297367, Retrieved from the Internet: URL:http://web.archive.org/web/20150219124837/http://www.grtavionics.com [retrieved on Aug. 24, 2016].

RV6airplanePilot, "GRT EFIS Actual Approach using Synthetic Approach Mode", Aug. 30, 2009, p. 1, XP054976804, Retrieved from the Internet: URL:https://www.youtube.com/watch?v=lcm44_YQeF] [retreived on Sep. 27, 2016].

* cited by examiner

FLIGHT DECK DISPLAY SYSTEMS AND METHODS FOR GENERATING VERTICAL SPEED ALERTS DURING STEEP APPROACHES OF ROTARY WING AIRCRAFT

TECHNICAL FIELD

The following disclosure relates generally to flight deck display systems and, more particularly, to systems and methods for generating a vertical speed alerts during steep approaches of rotary wing aircraft.

BACKGROUND

Rotary wing aircraft are capable of performing highly steep approaches unsuitable for fixed wing aircraft. It is important for a pilot to closely monitor the vertical speed of the rotary wing aircraft during a highly steep approach. One reason for this is the potential occurrence of a so-called "Vortex Ring State" condition or "settling with power," which can cause a sudden and rapid increase in the downward vertical speed of the aircraft. A Vortex Ring State (VRS) condition occurs when the main rotor of the rotary wing aircraft is enveloped by disturbed air, which significantly diminishes the ability of the aircraft to generate lift. An unsafe scenario can thus result if the rotary wing aircraft is in relatively close proximity to ground level and the pilot is afforded little time to recover from the VRS condition. Considerable efforts have been expended to develop improved flight deck display systems and approach guidance systems (e.g., Localizer Performance with Vertical Guidance systems) to assist pilots in the performance of steep approaches. However, even with such systems in place, pilots of rotary wing aircraft continue to encounter VRS conditions during highly steep approaches, which are increasingly required to satisfy noise abatement rules, to permit landing in dense urban areas, and for other reasons.

There thus exists an ongoing need to provide improved systems and methods for enhancing pilot awareness of excessive vertical speeds during steep approaches of rotary wing aircraft. It is particularly desirable to provide flight deck display systems capable of generating prominent and intuitive visual warnings alerting a pilot to excessive vertical speeds during a steep approach of a rotary wing aircraft and, therefore, to the possible occurrence of a VRS condition during the approach. Other desirable features and characteristics of the present invention will become apparent from the subsequent Detailed Description and the appended Claims, taken in conjunction with the accompanying Drawings and the foregoing Background.

BRIEF SUMMARY

Embodiments of a flight deck display system deployed onboard a rotary wing aircraft are provided. In one embodiment, the flight deck display system includes a controller operably coupled to a cockpit display device. The controller is configured to: (i) generate a Primary Flight Display (PFD) on the cockpit display device including a vertical speed indicator; (ii) establish a first vertical speed alert threshold; (iii) compare the first vertical speed alert threshold to a current vertical speed of the rotary wing aircraft; and (iv) if the current vertical speed of the rotary wing aircraft exceeds the first vertical speed alert threshold, produce a first vertical speed alert on the PFD by altering the appearance of the vertical speed indicator in a first predetermined manner.

In another embodiment, the flight deck display system includes a cockpit display device and onboard data sources, which are configured to monitor a current vertical speed and a current Above Ground Level (AGL) altitude of the rotary wing aircraft. A controller is operably coupled to the cockpit display device and to the onboard data sources. The controller is configured to establish a vertical speed alert threshold as a function of the current AGL altitude of the rotary wing aircraft, compare the vertical speed alert threshold to the current vertical speed of the rotary wing aircraft produce a vertical speed alert on the cockpit display device if the current vertical speed of the rotary wing aircraft exceeds the vertical speed alert threshold.

Methods for generating an excessive vertical speed alert on a cockpit display device of a rotary wing aircraft are further provided. The method is carried-out by a flight deck display system deployed on the rotary wing aircraft and including a controller operably coupled to the cockpit display device. In one embodiment, the method includes generating a PFD including a vertical speed indicator on the cockpit display device. A first vertical speed alert threshold is established at or by the controller, which then determines whether a current vertical speed of the rotary wing aircraft exceeds the first vertical speed alert threshold. A visual alert is produced on the PFD by altering the appearance of the vertical speed indicator in a first predetermined manner if the current vertical speed of the rotary wing aircraft surpasses the first speed alert threshold.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

As indicated in the foregoing section entitled "BACKGROUND," it is important for a pilot to closely monitor the vertical speed of the rotary wing aircraft during a highly steep approach, such as an approach having a glide slope angle of ~9° or higher. It is particularly desirable to enhance pilot awareness of any sudden increase in the vertical speed of the aircraft in a downward direction as this can be indicative of a Vortex Ring State (VRS) condition requiring the pilot's immediate attention. Furthermore, it is desirable for the pilot to gain such awareness as quickly as possible to maximize both the time period available for performing corrective actions and the existing vertical separation between the aircraft and ground level. Conventional Primary Flight Displays (PFDs) of rotary wing aircraft are typically generated to include a vertical speed indicator, which indicates or visually denotes the current vertical speed of the rotary wing aircraft. The present inventors have determined, however, that the focal point of a pilot is often directed toward a region of the PFD offset from the vertical speed indicator when performing an approach. This can decrease the likelihood of a pilot promptly noticing an undesirably rapid increase in the vertical speed of the rotary wing aircraft in a downward or Earth-bound direction during an approach, whether the increase in vertical speed is caused by a VRS condition or a different underlying condition.

The following describes embodiments of a flight deck display system, which provides excessive vertical speed alerts indicating when the vertical speed of a rotary wing aircraft exceeds one or more vertical speed alert thresholds. As described below, the vertical speed alert threshold(s) are preferably dynamic and adjusted based upon the proximity of the aircraft to ground level. In certain embodiments, the vertical speed alert threshold(s) may also be adjusted or fine tuned based upon any number of secondary factors, which are further known to contribute to the potential occurrence of a VRS condition. When determining that the vertical speed of the aircraft has surpassed a vertical speed alert threshold, a visual alert is produced on a graphical display generated on cockpit display device. More specifically, the excessive speed alert is preferably produced by altering the appearance of a vertical speed indicator included in a PFD generated on the display device. If desired, other neighboring graphic elements produced on the PFD may also be visually altered during the alert and/or other supplemental alerts may be simultaneously generated, such as haptic and/or audible alerts. The visual alert produced on the PFD can be, for example, any combination of changes in color, size, animation, symbology, and/or shape of the graphical elements included in the vertical speed indicator. It is further preferred that multiple excessive vertical speed thresholds are established such that a range of alerts can be generated, which are elevated in visual prominence should the excessive speed conditions become increasingly critical. By producing visual alerts in the region of the vertical speed indicator in this manner, embodiments of the flight deck display system can provide a pilot with an intuitive and prominent visual cue of the excessive vertical speed of the rotary wing aircraft and the possible occurrence of a VRS condition. This, in turn, affords the pilot a maximum period of time to perform any needed corrective actions.

Figure 1:
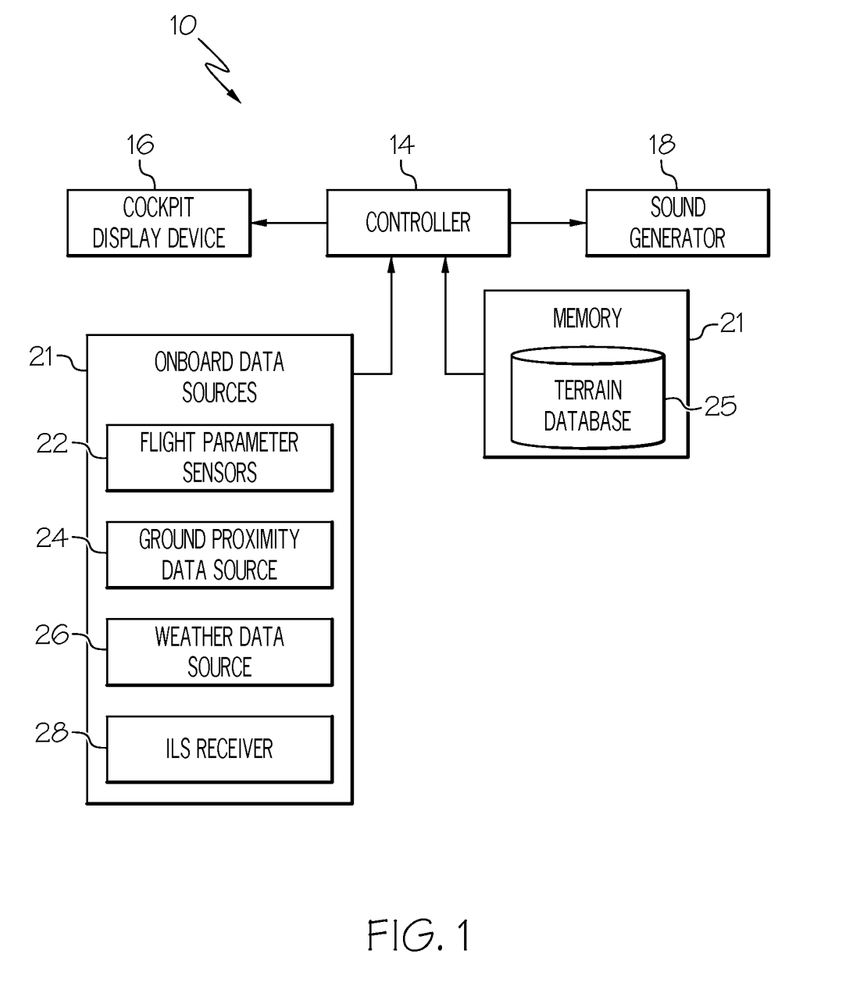
FIG. 1 is a block diagram of a flight deck display system deployed onboard a rotary wing aircraft and illustrated in accordance with an exemplary embodiment of the present invention.

FIG. 1 is a block diagram of a flight deck display system 10 deployed onboard a rotary wing aircraft, as illustrated in accordance with an exemplary and non-limiting embodiment of the present invention. In the illustrated exemplary embodiment, display system 10 includes the following components, each of which may be comprised of multiple devices, systems, or elements: (i) a controller 14; (ii) a cockpit display device 16; (iii) a sound generator 18; (iv) onboard data sources 20; and (vi) memory 21. Controller 14 includes at least first and second inputs, which are operatively coupled to onboard data sources 20 and to memory 21, respectively. Additionally, controller 14 further includes at least first and second outputs, which are operatively coupled to cockpit display device 16 and to sound generator 18, respectively. In further embodiments wherein flight deck display system 10 does not include sound generator 18, controller 14 may include only a single output operatively coupled to cockpit display device 16. In further embodiments, display system 10 may include a greater or lesser number of components, which may be interconnected in various different manners.

Cockpit display device 16 may assume the form of any monitor or image-generating device suitable for producing a graphical display, such as a PFD, including excessive vertical speed alerts of the type described herein. Cockpit display device 16 will typically be affixed to the static structure of the aircraft, but may also be a movable display device (e.g., a head-worn display device) or a wireless display device carried into the cockpit, such as an Electronic Flight Bag (EFB). Controller 14 helps drive display device 16 and can assume any form for generating graphical display (e.g., PFD) thereon and for preforming the other functions described herein. In this regard, controller 14 may comprise, or be associated with, any suitable number of individual microprocessors, flight control computers, navigational equipment, memories (including or in addition to memory 21), power supplies, storage devices, interface cards, and other standard components known in the art. Furthermore, controller 14 may include or cooperate with any number of software programs (e.g., avionics display programs) or instructions designed to carry out the various methods, process tasks, calculations, and control/display functions described below. Although illustrated as a separate block in FIG. 1, memory 21 may be integrated into controller 14 in certain embodiments.

Onboard data sources 20 can include any number of onboard sensors, datalinks, and the like for directly monitoring or wirelessly receiving data useful in performing the processes described herein. The particular types of data collected by onboard data sources 20 and then provided to controller 14 will vary amongst different embodiments of flight deck display system 10. Generally, at minimum, onboard data sources 20 will supply data to controller 14 describing the current vertical speed of the rotary wing aircraft, as well as data indicative of the current proximity of the aircraft to ground level (also referred to herein as the "Above Ground Level" or "AGL" altitude). In this regard, as indicated in FIG. 1, onboard data sources 20 can include a number of flight parameter sensors 22, which provide data describing the current vertical speed of the rotary wing aircraft; and a ground proximity data source 24, which provides data indicative of the current AGL altitude. Ground proximity data source 24 can be, for example, a sensor or system that directly measures the vertical distance between the aircraft and the ground surface, such as a radar altimeter included in a Enhanced Ground Proximity Warning System (EPGWS).

In certain embodiments, onboard data sources 20 may further supply controller 14 with additional data describing other parameters or secondary factors, which can contribute to the occurrence of a VRS condition. Such secondary factors can include, but are not limited to, glide slope angle, air speed, weather conditions (e.g., wind speed and direction), aircraft pitch angle, and ground surface characteristics. In such cases, air speed and aircraft pitch angle may be monitored by flight parameter sensors 22 shown in FIG. 1. Data describing the current weather conditions may be provided by or received via a weather data source 26, which can include onboard data sensors (e.g., an onboard weather radar) and/or a datalink for wirelessly receiving weather information from a remote source. In one embodiment, weather data source 26 is a datalink that receives data global weather data through the Iridium satellite network. Glide slope angle can be calculated from information received by an Instrument Landing System (ILS) receiver 28, which may be further included in onboard data sources 20 in some embodiments. Finally, information pertaining to the ground surface characteristics can be monitored directly by onboard sensors and/or recalled from a terrain database 25 stored in memory 21. In the latter case, terrain database 25 may store information describing the terrain topology and surface type for a geographical region, which may be correlated with the current aircraft position to determine the terrain topology and surface type at the approach area.

Figure 2:
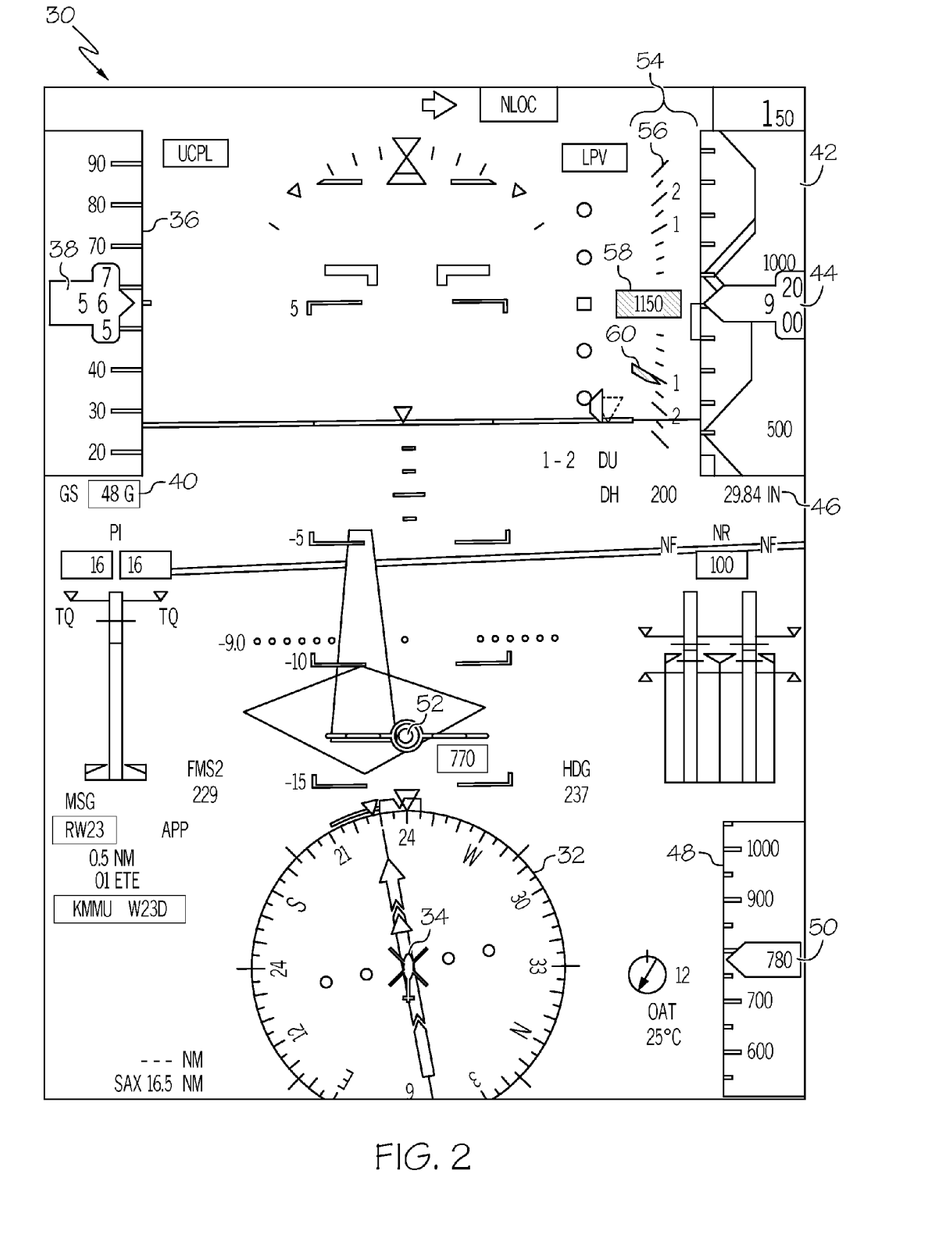
FIG. 2 is a screenshot of an exemplary Primary Flight Display (PFD), which may be generated by the flight deck display system shown in FIG. 1 and which includes a vertical speed indicator (shown in an informational or non-alert state)

FIG. 2 is a screenshot of an exemplary PFD 30 that may be generated on cockpit display device 16 by controller 14 during operation of flight deck display system 10 (FIG. 1). As can be seen, PFD 30 is a Synthetic Vision System (SVS) display including graphical renderings of terrain and other geographical features representing the view from the cockpit under ideal visibility conditions (a so-called "glass cockpit" view). PFD 30 further includes various different graphic elements and symbology visually relating the current flight parameters of the rotary wing aircraft on which display system 10 is deployed. The graphic elements shown in FIG. 2 are generally well-known within the avionics industry and will not be described in detail herein. However, for completeness, it is briefly noted that the illustrated PFD 30 contains the following graphic elements: (i) a compass 32 centered about a helicopter icon 34 (located in the bottom center of PFD 30); (ii) an airspeed indicator or "airspeed tape" 36, which features a precision readout window 38 (located in the upper left corner of PFD 30); (iii) a ground speed readout 40 (located beneath airspeed tape 36); an altitude indicator or "altitude tape" 42, which features a precision readout window 44 (located in the upper right corner of PFD 30); (iv) a barometric pressure setting readout 46 (located beneath altitude tape 42); (v) a radio altitude indicator 48, which features a precision readout window 50 (located in the lower right corner of PFD 30); and (vi) a flight path vector icon 52, which moves across PFD 30 to reflect changes in the flight path of the rotary wing aircraft.

In addition to the above-listed elements, PFD 30 further includes a number of graphic elements dedicated to visually expressing or denoting the vertical speed of the rotary wing aircraft. Such graphic elements are collectively referred to herein as the "vertical speed indicator" and are identified in FIG. 2 by reference numeral "54." In FIG. 2, vertical speed indicator 54 includes: (i) vertical speed scale 56 located to the left of altitude tape 42, (ii) a precision readout window 58, which provides an enlarged textual readout of the current vertical speed of the aircraft; and (iii) a pointer icon 60, which identifies the current vertical speed of the rotary wing aircraft on vertical speed scale 56. In contrast to certain conventional fixed wing aircraft PFDs, vertical speed indicator 54 is prominently positioned in a central region of the PFD 30 more likely to reside in the pilot's primary scan path. This positioning underscores the importance of quickly relating the vertical airspeed to the pilot of a rotary wing aircraft. Despite this, and as previously noted, a pilot's attention can be directed toward a region of the PFD spatially offset from vertical speed indicator 54 during an approach; e.g., the pilot's attention may be directed toward flight path vector icon 52, which may gradually migrate away from vertical speed indicator 54 during the approach. Flight deck display system 10 (FIG. 1) helps mitigate this problem by selectively generating visual alerts on PFD 30 to quickly draw a pilot's attention to vertical speed indicator 54 should an excessive vertical speed condition occur during an approach.

Controller 14 of flight deck display system 10 (FIG. 1) generates visual alerts on PFD 30 (FIG. 2) when one or more vertical speed alert thresholds are surpassed or exceeded (as considered in a downward direction utilizing positive values for the vertical speed thresholds and the current vertical speed of the aircraft). Controller 14 may establish any particular number of vertical speed alert thresholds and generate various different levels of visual alerts on PFD 30. For example, in a simplified embodiment, controller 14 may establish a single speed change threshold and generate a single visual alert should the vertical speed of the aircraft surpass the threshold. This notwithstanding, it is preferred that controller 14 establishes multiple vertical speed thresholds including, at minimum: (i) a first vertical speed alert threshold (referred to as a "vertical speed caution threshold"), which is utilized to determine when a low level caution alert should be generated on PFD 30; and (ii) a second vertical speed alert threshold (referred to as the "vertical speed warning threshold"), which is utilized to determine when a high level warning alert should be generated on PFD 30. Both thresholds are preferably dynamic and adjusted in relation to the current AGL altitude of the rotary wing aircraft. Additionally, in at least some embodiments, the vertical speed alert thresholds can further be adjusted or refined based upon secondary factors also known to affect the likelihood of a VRS condition, as described more fully below.

As a point of emphasis, the manner in which the dynamic vertical speed alert thresholds are established will vary between embodiments of flight deck display system 10 (FIG. 1) in relation to a number of different factors pertaining to the particular rotary wing aircraft on which display system 10 is deployed, such as airframe design and main rotor characteristics. It is within the ability of one of ordinary skill in the avionics industry to establish appropriate algorithms, formulae, multidimensional look-up tables, and/or the like for determining the dynamic vertical speed alert thresholds, given the benefit of this document. This notwithstanding, certain relationships between the vertical speed alert thresholds and factors affecting such dynamic thresholds can be generally observed, at least in most cases. First and foremost, it will often be the case that the vertical speed alert thresholds will decrease in value (that is, move closer to a zero value) as the distance between the aircraft and ground level (AGL altitude) decreases. For example, if controller 14 (FIG. 1) were to establish a first vertical speed threshold to be 1000 feet per minute when the rotary wing aircraft is located at 200 feet AGL, controller 14 may adjust the first vertical speed threshold downward to 750 feet per minute should the aircraft descend to 100 feet AGL, as flight crews will have less time to arrest the descent. This downward adjustment in the vertical speed threshold reflects an increase in the likelihood of a VRS condition and further ensures that an alert is triggered at a lower speed threshold to provide the pilot with greater time to take corrective actions should an undesired increase in vertical speed occur.

In many embodiments, controller 14 of flight deck display system 10 (FIG. 1) may consider solely the current AGL altitude and vertical speed of the rotary wing aircraft in determining whether to generate an excessive vertical speed alert. In more complex embodiments, controller 14 can further consider one or more secondary factors known to contribute the occurrence of a VRS condition in determining whether an excessive vertical speed alert should be generated. Generally, such secondary factors will be afforded less weight or influence on the vertical speed thresholds than does the current AGL altitude and, thus, may be referred to as "refining" or "fine tuning" the dynamic thresholds. A non-exhaustive list of such secondary factors includes glide slope angle, current aircraft heading, current air speed, current weather conditions (e.g., wind speed and direction), current aircraft pitch angle, and ground surface characteristics. These secondary factors, when considered, will often have the following general effect on the dynamic vertical speed thresholds. The vertical speed thresholds will typically be adjusted downwards in value (that is, adjusted closer to a zero value) with increasing glide slope angle, with increasing pitch angle, and/or with decreasing air speeds as the rotary wing aircraft is less able to move out of the disturbed air created by its main rotor and the probability of a VRS condition increases correspondingly. Similarly, the vertical speed thresholds will also be adjusted downwards in value with increasing tailwinds (as determined from the current wind speed, wind direction, and aircraft heading data) as it is increasingly likely that the disturbed air created by aircraft will be carried forward toward the main rotor again increasing the probability of a VRS condition. Finally, the vertical speed thresholds will typically be adjusted upwards in value when the ground surface characteristics are more likely to dissipate the main rotor downwash such that the occurrence of a VRS condition is less likely. The following general observations are made by way of example only and need not apply across all embodiments of flight deck display system 10. In other embodiments, the above-listed secondary factors may not be considered in establishing the vertical speed alert threshold(s) or different sets of secondary factors may be considered.

Figure 3:
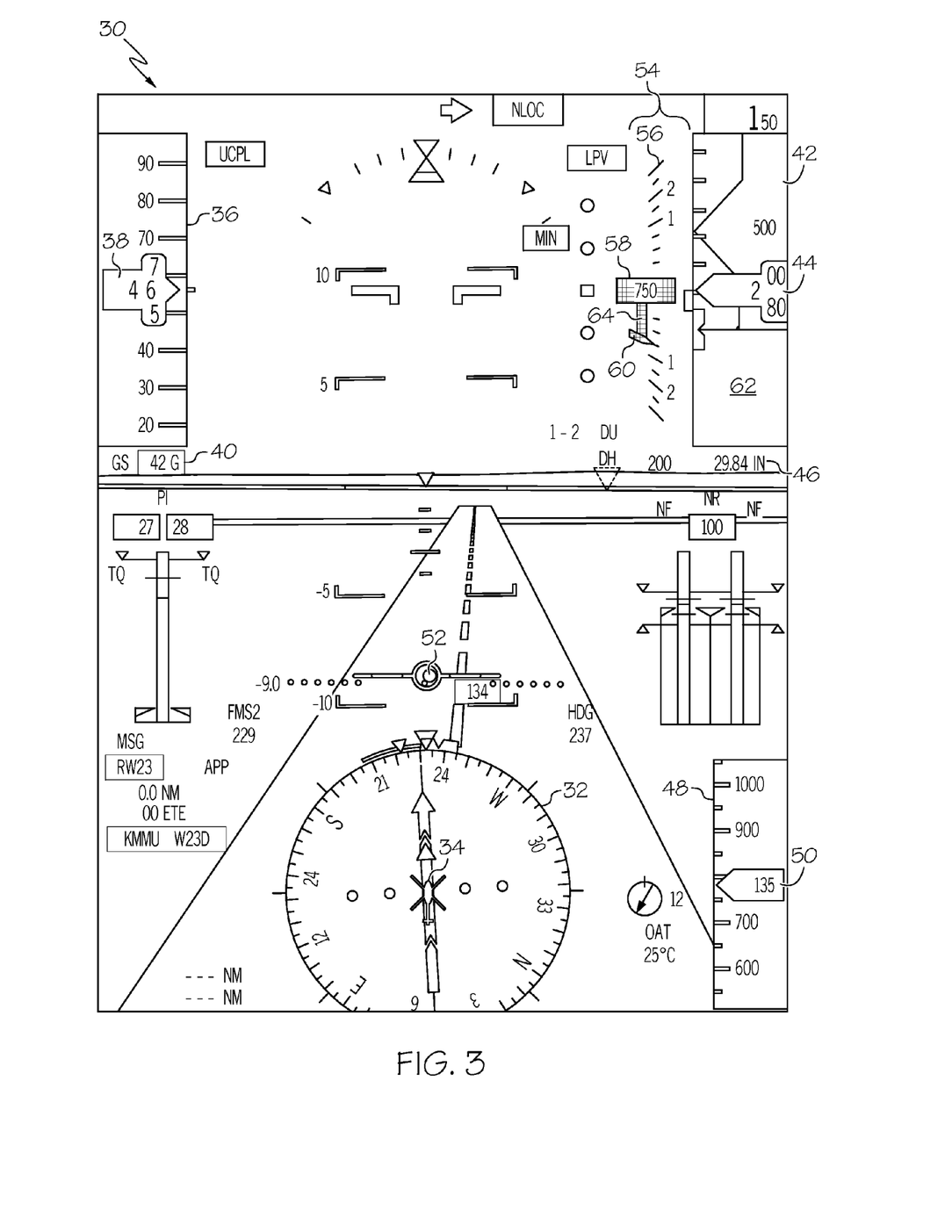
FIG. 3 is a screenshot of the exemplary PFD shown in FIG. 2 wherein the appearance of the vertical speed indicator has been altered in a first predetermined manner indicative of a low level excessive vertical speed caution alert.
Figure 4:
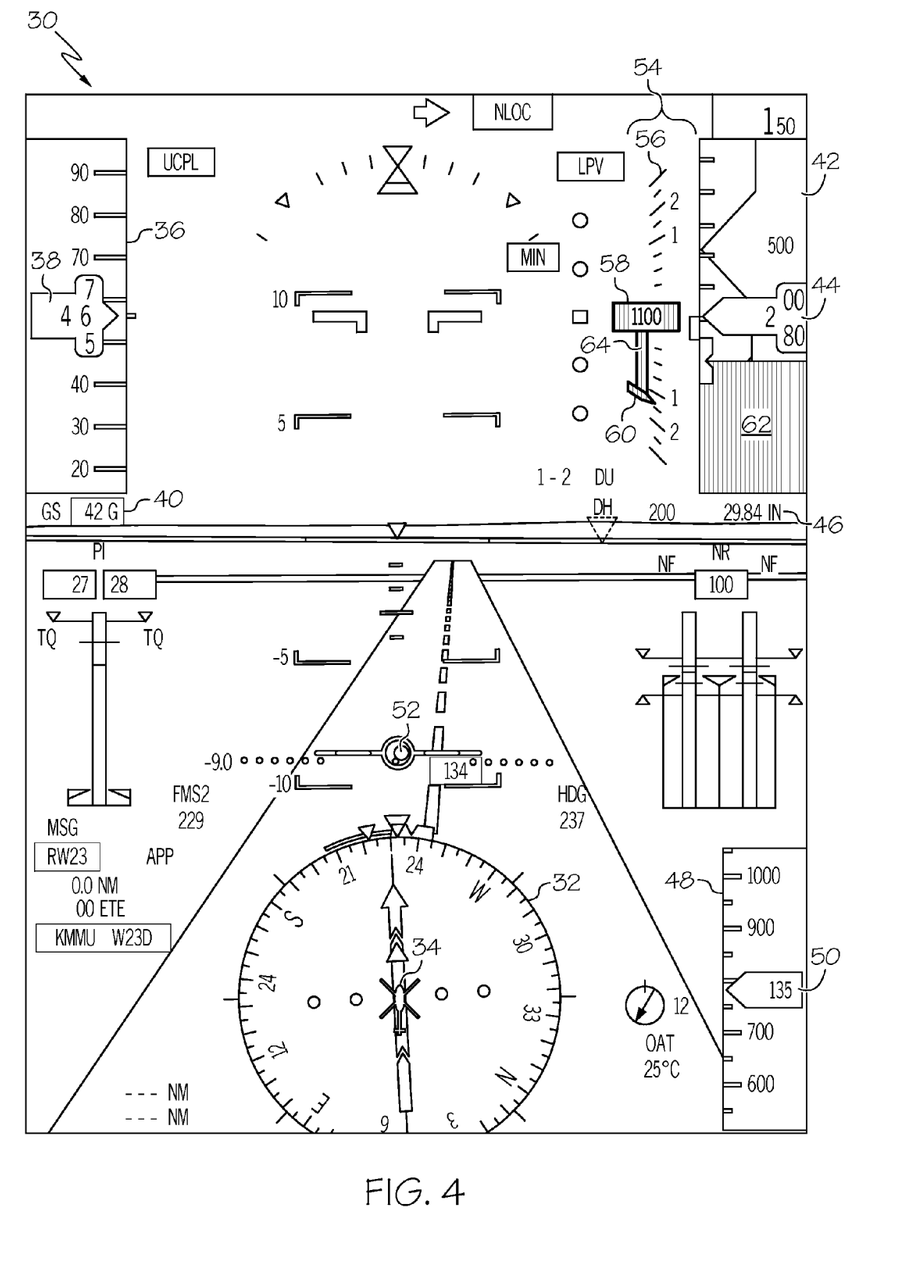
FIG. 4 is a screenshot of the exemplary PFD shown in FIGS. 2-3 wherein the appearance of the vertical speed indicator has been altered in a second predetermined manner indicative of a high level excessive vertical speed warning alert.

Additional description of flight deck display system 10 will now be provided in conjunction with FIGS. 2-4 and in an exemplary implementation wherein display system 10 generates alerts based upon vertical speed caution and warning thresholds. With initial reference to FIG. 2, PFD 30 is shown in a non-alert or informational state. In this scenario, the AGL altitude of the rotary wing aircraft is relatively high (780 feet) and controller 14 of display system 10 (FIG. 1) has established the vertical speed alert thresholds to be correspondingly high. For example, in the scenario illustrated in FIG. 2, controller 14 may establish the vertical speed caution and warning thresholds to be 1500 and 2000 vertical feet per minute, respectively. Thus, even thought the current vertical speed of the rotary wing aircraft is also relatively high in FIG. 2 (1150 vertical feet per minute in a downward direction), the current vertical speed does not exceed either vertical speed alert threshold. Display system 10 thus drives cockpit display device 16 to generate PFD 30 such that vertical speed indicator 54 is shown in a default format. In the default format, vertical speed scale 56 may be generated in a non-alert or informational format and color, such as white. Similarly, precision readout window 58 and pointer icon 60 may also be produced to a less pronounced appearance and a non-alert color, such as green (represented in FIG. 2 by a first style of cross-hatching).

Turning now to FIG. 3, PFD 30 is shown during the generation of a low level, excessive vertical speed caution alert. In this scenario, the AGL altitude and vertical speed of the rotary wing aircraft has decreased to 135 feet and 750 feet per minute, respectively. As the AGL altitude of the rotary wing aircraft is now relatively low, a ground element 62 representing ground level can now be seen in altitude tape 42. In response to this decrease in AGL altitude, controller 14 of flight deck display system 10 (FIG. 1) has decreased the vertical speed alert thresholds. For example, controller 14 may now determine that the vertical speed caution threshold has decreased from its previous value to 700 feet per minute, while the vertical speed warning threshold has decreased to 900 feet per minute. Thus, in the scenario shown in FIG. 3, the vertical speed of the rotary wing aircraft now exceeds the vertical speed caution threshold and a corresponding alert is generated on PFD 30. The vertical speed caution alert can be produced by changing the appearance of the vertical speed indicator 54 in any number of different manners. For example, as indicated in FIG. 3, the numerical readout in precision readout window 58 may be increased in size and change to an alert color, such as amber (represented in FIG. 3 by a second style of cross-hatching), in accordance with a predetermined color coding scheme (referred to herein more simply as being "color coded" to the alert color). Similarly, pointer icon 60 may also be generated to have an increased size and color coded to the alert color. If desired, additional graphics can also be produced on PFD 30 indicative of the vertical speed warning alert. For example, a graphic 64 (referred to herein as a "thermometer") can be produced at a location adjacent precision readout window 58, which visually connects window 58 to pointer icon 60. Thermometer 64 can also be color coded to the warning color. Various additional changes in the appearance of vertical speed indicator 54 can further be made including alterations in the appearance of vertical speed scale 56. For example, the appearance of other graphical elements nearby vertical speed indicator 54 (e.g., ground element 62 in altitude tape 42) can also be altered during generation of the caution alert in further embodiments.

Finally, with respect to FIG. 4, PFD 30 is shown during the generation of a high level, vertical speed warning alert. As was previously the case, the AGL of the rotary wing aircraft is 135 feet, the vertical speed warning threshold may be 700 feet per minute, while the vertical speed caution threshold may be 900 feet per minute. However, in the scenario illustrated in FIG. 4, the vertical speed of the aircraft is now 1000 feet per minute in a downward direction thus exceeding the vertical speed warning threshold. Accordingly, a vertical speed warning alert is generated on PFD 30. In the illustrated example, the vertical speed warning alert include changes in the color and/or appearance of precision readout window 58, pointer icon 60, and thermometer 64, all of which may be generated to have a more pronounced appearance (e.g., a larger size) and color coded to a predetermined warning color, such as red (represented in FIG. 4 by a third style of cross-hatching). Various additional changes in the appearance of vertical speed indicator 54 can also be made including alterations in the appearance of vertical speed scale 56. Additionally, the appearance of neighboring graphical elements can also be altered during generation of the warning alert; e.g., as shown in FIG. 3, the color coding and/or opacity of ground element 62 can be increased during generation of the warning alert. Other possible changes include, but are not limited to, flashing or otherwise animating one or more of the graphical elements included within vertical speed indicator 54.

The foregoing has thus provided embodiments of a flight deck display system for generating visual feedback indicating when the vertical speed of a rotary wing aircraft exceeds one or more vertical speed alert thresholds. As described above, the vertical speed alert threshold(s) are preferably dynamic and adjusted based upon the proximity of the aircraft to ground level and, in certain embodiments, other secondary factors affecting the likelihood of a VRS condition. Stated differently, the controller of the display system may establish the speed alert threshold(s) as a function of the current AGL altitude and, perhaps, one or more additional parameters, such as the magnitude of current tailwind speeds. The excessive vertical speed alerts can be visually or graphically expressed as alterations in the appearance of the vertical speed indicator of a PFD and possibly other neighboring graphic elements produced on the PFD. In preferred embodiments, multiple excessive speed thresholds are established such that the alerts are graded and increase in visual prominence in accordance with the increasingly criticality of the excessive vertical speed conditions. By providing visual alerts in the region of the vertical speed indicator in this manner, embodiments of the flight deck display system provide the pilot with an intuitive and prominent visual cue of the excessive vertical speed of the rotary wing aircraft. Furthermore, it will be appreciated that other alerts can be generated in conjunction with the visual alerts to further direct a pilot's attention to the occurrence of an excessive vertical speed condition. Such other alerts can include audible and haptic alerts. In an embodiment, such supplemental alerts are aural alerts generated utilizing sound generator 18 (FIG. 1). For example, when the high level vertical speed warning threshold has been surpassed, controller 14 of flight deck display system 10 can cause the following audible message to be annunciated via sound generator 18: "WARNING—EXCESSIVE VERTICAL SPEED."

While the foregoing exemplary embodiment was described above in the context of a fully functioning computer system (i.e., flight deck display system 10 shown in FIG. 1), those skilled in the art will recognize that the mechanisms of the present invention are capable of being distributed as a program product (i.e., an autobrake control program) and, furthermore, that the teachings of the present invention apply to the program product regardless of the particular type of non-transitory, computer-readable media (e.g., floppy disc, hard drive, memory card, optical disc, etc.) employed to carry-out its distribution. Indeed, in certain embodiments and depending upon the existing equipment deployed onboard a rotary wing aircraft, a flight deck display system providing the above-described vertical speed alert functionality can be realized or implemented in at least some embodiments through a relatively simple software upgrade.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A flight deck display system deployed onboard a rotary wing aircraft, the flight deck display system comprising:
    a cockpit display device; and
    a controller operably coupled to the cockpit display device, the controller configured to:
        generate a Primary Flight Display (PFD) on the cockpit display device including a vertical speed indicator;
        establish a first vertical speed alert threshold;
        compare the first vertical speed alert threshold to a current vertical speed of the rotary wing aircraft; and
        if the current vertical speed of the rotary wing aircraft exceeds the first vertical speed alert threshold, produce a first vertical speed alert on the PFD by altering the appearance of the vertical speed indicator in a first predetermined manner.

2. The flight deck display system of claim 1 wherein the first vertical speed alert threshold is a vertical speed caution threshold, and wherein the controller is further configured to:
    establish a vertical speed warning threshold; and
    if the current vertical speed of the rotary wing aircraft exceeds the vertical speed warning threshold, produce a second vertical speed alert on the PFD by altering the appearance of the vertical speed indicator in a second predetermined manner.

3. The flight deck display system of claim 2 wherein the controller is configured to change a color of a first graphic element included in the vertical speed element to a caution color when generating the first vertical speed alert and to a warning color when generating the second vertical speed alert.

4. The flight deck display system of claim 3 wherein the first graphic element comprises a precision vertical speed readout window.

5. The flight deck display system of claim 4 wherein the first graphic element comprises a pointer icon pointing to the current vertical speed of the rotary wing aircraft on a vertical speed scale.

6. The flight deck display system of claim 1 wherein the vertical speed indicator includes a precision vertical speed readout window, and wherein the controller is configured to produce the first vertical speed alert by adding a new graphic element to the vertical speed indicator at a location adjacent the precision vertical speed readout window.

7. The flight deck display system of claim 1 further comprising an onboard data source coupled to the controller and configured to supply thereto data indicative of a current Above Ground Level (AGL) altitude of the rotary wing aircraft, and wherein the controller is configured to establish the first vertical speed alert threshold as a function of the current AGL altitude.

8. The flight deck display system of claim 7 wherein the controller is configured to decrease the first vertical speed alert threshold as the current AGL altitude decreases.

9. The flight deck display system of claim 7 wherein the controller is further configured to adjust the first vertical speed alert threshold in relation to at least one of the group consisting glide slope angle, air speed, wind speed and direction, aircraft pitch angle, and ground surface characteristics.

10. A flight deck display system deployed onboard a rotary wing aircraft, the flight deck display system comprising:
    a cockpit display device;
    onboard data sources configured to monitor a current vertical speed of the rotary wing aircraft and a current Above Ground Level (AGL) altitude of the rotary wing aircraft; and
    a controller operably coupled to the cockpit display device and to the onboard data sources, the controller configured to:
        establish a vertical speed alert threshold as a function of the current AGL altitude of the rotary wing aircraft;
        compare the vertical speed alert threshold to the current vertical speed of the rotary wing aircraft; and produce a vertical speed alert on the cockpit display device if the current vertical speed of the rotary wing aircraft exceeds the vertical speed alert threshold.

11. The flight deck display system of claim 10 wherein the controller is further configured to produce a Primary Flight Display (PFD) on the cockpit display device including graphics indicating a current vertical speed of the current vertical speed of the rotary wing aircraft, and wherein the controller is configured to change the appearance of the graphics when producing the vertical speed alert.

12. The flight deck display system of claim 11 wherein the controller is configured to change the color coding of the graphics when producing the vertical speed alert.

13. The flight deck display system of claim 10 wherein the onboard data sources further provide the controller with data indicative of current tailwind speeds, and wherein the controller is further configured to adjust the vertical speed alert threshold based upon the magnitude of the current tailwind speeds.

14. The flight deck display system of claim 10 wherein the onboard data sources further provide the controller with data indicative of a glide slope angle of an approach flown by the rotary wing aircraft, and wherein the controller is further configured to adjust the vertical speed alert threshold based upon the glide slope angle.

15. The flight deck display system of claim 10 wherein the onboard data sources further provide the controller with data indicative of the current air speed of the rotary wing aircraft, and wherein the controller is further configured to adjust the vertical speed alert threshold based upon the current air speed.

16. The flight deck display system of claim 10 wherein the onboard data sources further provide the controller with data indicative of the current pitch angle of the rotary wing aircraft, and wherein the controller is further configured to adjust the vertical speed alert threshold based upon the current pitch angle.

17. The flight deck display system of claim 10 further comprising a terrain database coupled to the controller, the controller further configured to:

recall data from the terrain database indicative of ground surface characteristics at an approach area; and adjust the vertical speed alert threshold based upon the ground surface characteristics at the approach area.

18. A method for generating an excessive vertical speed alert on a cockpit display device of a rotary wing aircraft, the method carried-out by a flight deck display system deployed on the rotary wing aircraft and including a controller operably coupled to the cockpit display device, the method comprising:

on the cockpit display device, generating a Primary Fight Display (PFD) including a vertical speed indicator;

at the controller, establishing a first vertical speed alert threshold;

at the controller, determining whether a current vertical speed of the rotary wing aircraft exceeds the first vertical speed alert threshold; and producing a visual alert on the PFD by altering the appearance of the vertical speed indicator in a first predetermined manner if the current vertical speed of the rotary wing aircraft surpasses the first speed alert threshold.

19. The method of claim 18 wherein the first vertical speed alert threshold is a vertical speed caution threshold, and wherein the method further comprises:

establishing a vertical speed warning threshold; and producing a second vertical speed alert on the PFD by altering the appearance of the vertical speed indicator in a second predetermined manner if the current vertical speed of the rotary wing aircraft exceeds the vertical speed warning threshold.

20. The method of claim 18 wherein the controller establishes the first vertical speed alert as a function of a current Above Ground Level (AGL) altitude such that the first vertical speed alert decreases in value as the current AGL altitude decreases.

* * * * *